Dec. 3, 1929.	H. KORNREICH	1,738,301
METHOD OF MAKING SAUSAGE ROLLS
Filed March 10, 1928
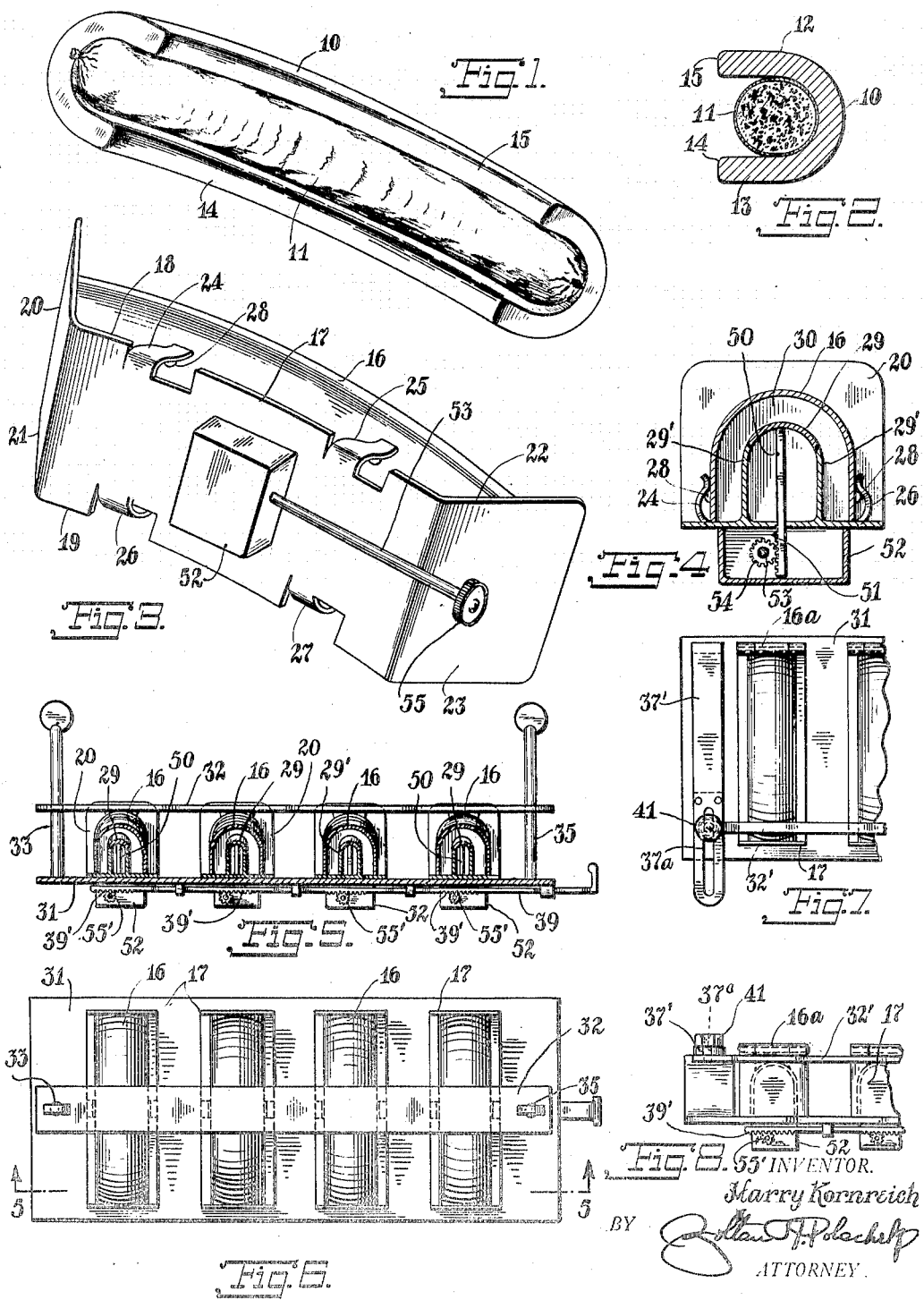
INVENTOR.
Harry Kornreich
BY
ATTORNEY.

Patented Dec. 3, 1929

1,738,301

UNITED STATES PATENT OFFICE

HARRY KORNREICH, OF NEW YORK, N. Y.

METHOD OF MAKING SAUSAGE ROLLS

Application filed March 10, 1928. Serial No. 260,559.

This invention relates to a new and useful sausage roll adapted to replace the usual roll such as ordinarily used in combination with a sausage to provide the usual "hot dog" served at lunch counters, restaurants and the like.

The object of the invention is to provide a sausage roll formed or shaped so as to readily conform to and hold the sausage, rendering the eating of the sausage easier and more pleasant.

Another object of the invention is to provide a sausage roll having a crusty surface both inside and outside rendering same more tasty.

Another object is to provide a sausage roll readily and easily handled by the vendor and by the person eating same, especially when the sausage contained therein is covered or dressed with mustard, sauerkraut or the like, so as to prevent dripping of the said dressing on the fingers or wearing apparel of the person eating same.

Another object is to provide a sausage roll evenly divided relative to the sausage placed therein, the said roll being shaped to hold the sausage in place therein, so as to prevent the sausage from rolling out when served on a plate or the like.

A further object of the invention is to provide a sausage roll which will provide a more appetizing food medium due to the even distribution of the roll over the entire sausage.

Other pertinent objects will appear in the accompanying description, appended claims and in the following drawing.

Fig. 1 is a perspective view of my improved sausage roll showing a sausage in place therein, as same would appear when prepared for eating.

Fig. 2 is a transverse vertical sectional view thereof.

Fig. 3 is a perspective view of the mold in which my improved sausage roll is made or baked.

Fig. 4 is a transverse sectional view thereof.

Fig. 5 is a front elevational view illustrating a further development of the mold, this view being taken on the line 5—5 of Fig. 6.

Fig. 6 is a top plan view thereof.

Fig. 7 is a fragmentary top plan view similar to Fig. 6 showing a modification thereof.

Fig. 8 is a front elevational view thereof.

As here embodied my improved sausage roll 10 is of elongated and somewhat curved or arc shape construction having a U shaped transverse section. The above described construction is such as will permit the usual sausage 11 to be readily placed therein, as clearly shown in Figs. 1 and 2. The extended portions 12 and 13 are approximately parallel and extended from the main portion of the sausage roll, and have their extremities 14 and 15, extended somewhat beyond the sausage, as clearly shown in Fig. 2.

The above mentioned and described sausage roll is made preferably of bread dough or batter such as ordinarily employed by bakers in the making of the usual rolls, which are commonly and generally used in place of my improved sausage roll and which are cut or partially sliced longitudinally so as to permit the sausage to be inserted therein, in the usual well known manner.

The mold used in making my improved sausage roll comprises a cover 16, suitably shaped to confirm to the outer contour of the sausage roll, and of hollow construction adapted to contain the above mentioned batter. The plate 17 is substantially shaped or formed so as to cover or enclose the open ends of the cover 16 and is of suitable size to extend somewhat beyond the edges of the said cover 16, as at 18, 19, 20, 21 and 22 and 23 at the top and two ends thereof respectively so as to securely enclose the said cover.

Clip elements 24, 25 and 26, 27 are formed or bent from the extended main portion of the plate 17, at the edges thereof and are adapted to engage protruding elements 28 of the cover 16, adjacent to the open end thereof. The latter described construction is such as will permit the cover to be removably held in place over the said container.

The plate 17 has secured thereto an inwardly extended member 29 and integral partitions 29' which together are similar with or uniform with the cover 16, and of suitable size to provide a uniform space 30, at the sides thereof, intermediate the cover 16 and the extended member 29 and partitions 29'. The above described construction is such as will permit the batter placed in the cover 16, when baked in the usual oven such as used for baking bread, rolls or the like, to assume the shape or contour of my improved above mentioned and described sausage roll.

A rod 50 is rigidly attached to the member 29 and slidably arranged thru the plate 17, the projecting end being formed with rack teeth 51. A casing 52 is attached to the plate 17 and a shaft 53 is rotatively supported therein. A gear 54 is fixed to the shaft and meshes with the rack 51. The shaft 53 is provided with a head 55.

In operation the cover 16 is removed after the device has been taken from a baking oven, and then head 55 turned to raise the member 29 for loosening the baked dough, or bread from the mould.

In Figs. 5 and 6, I have shown a plurality of the above described moulds with their plates 17 secured to a main plate 31. The covers 16 are secured to a strip 32 slidably mounted on posts 33 and 35 projecting from the plate 31, heads 37 and 38 respectively being attached to the tops of the posts. The heads 55' have gear teeth formed on their peripheries, and a rod 39 is slidably mounted to the plate 31 and has rack portions 39' meshing with the teeth 55'. The rod 39 may be manually moved to operate all of the members 29 in unison.

In Figs. 7 and 8, the covers 16 are hingedly connected, as at 16ª to the plate portion 20, and the opposite ends of the covers 16 are normally held in place by a bar 32' slidably mounted on the bracket 37', this bracket being formed with a slot 37ª accommodating a bolt 41 for this purpose.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention what I claim as new and desire to secure by United States Letters Patent:

1. As a means of making a sausage roll of the class described, a mold comprising a cover a plate adapted to enclose the open end and two ends of the said cover, a means of removably attaching the said cover to the said plate and a means for loosening dough from the device.

2. As a means of making a sausage roll of the class described, a mold comprising a cover, a plate adapted to enclose the open end and two ends of the said cover, a means of removably attaching the said cover to the said plate, said cover suitably shaped to conform to the outer contour of the sausage roll, an outwardly extended member secured to the said plate, said extended member concentric with the said cover for the purpose of providing a uniform space at the bottom and sides thereof, intermediate the said cover and the said extended member, as a means of permitting batter placed therein to be baked in the usual oven for the purpose of providing a sausage roll and a means for loosening the baked batter.

3. As a means of making a sausage roll of the class described, a mold comprising a cover, a plate adapted to enclose the open end and two ends of the said cover, a means of removably attaching the said cover to the said plate, said cover suitably shaped to conform to the outer contour of the sausage roll, an outwardly extended member secured to the said plate, said extended member concentric with the said cover for the purpose of providing a uniform space at the bottom and sides thereof, intermediate the said cover and the said extended member, as a means of permitting batter placed therein to be baked in the usual oven for the purpose of providing a sausage roll, said sausage roll of suitable shape so as to conform to and hold a sausage for the purpose of providing a convenient and readily eatable medium.

4. As a means of making a sausage roll of the class described, a mold comprising a cover a plate adapted to enclose the open end and two ends of the said cover, a means of removably attaching the said cover to the said plate, said cover suitable shaped to conform to the outer contour of the sausage roll, an outwardly extended member secured to the said plate, said extended member concentric with the said container for the purpose of providing a uniform space at the bottom and sides thereof, intermediate the said plate and the said extended member, as a means of permitting batter placed therein to be baked in the usual oven for the purpose of providing a sausage roll, said sausage roll of elongated somewhat curved shaped and having a U shape transverse section for the purpose of permitting a sausage to be placed therein.

5. As a means of making a sausage roll of the class described, a mold comprising a cover, a plate adapted to enclose the open end and two ends of the said cover, a means of removably attaching the said cover to the said plate, said cover suitably shaped to conform to the outer contour of the sausage roll, an outwardly extended member secured to the said plate, said extended member concentric with the said container for the purpose of providing a uniform space at the bottom and sides thereof, intermediate the said cover and the said extended member, as a means of permitting batter placed therein to be baked in the usual oven for the purpose of providing a sausage roll, said sausage roll of elongated somewhat curved shape and having a U shaped transverse section for the purpose of permitting a sausage to be placed therein, the main portion of the said sausage roll provided with extended elements approximately parallel and having their extremities extended somewhat beyond the said sausage.

6. A mold for making a sausage roll comprising a cover, a plate adapted to enclose the open top and two ends of the said container, a means of removably attaching the said cover to the said plate, said cover suitably shaped to conform to the outer contour of the sausage roll, an outwardly extended member secured to the said cover, said extended member concentric with the said container for the purpose of providing a uniform space at the bottom and sides thereof, intermediate the said container and the said extended member, as a means of permitting batter placed therein to be baked in the usual oven for the purpose of providing a sausage roll.

7. A mold for making a sausage roll comprising a cover, a plate adapted to enclose the open end and two ends of the said cover, a means of removably attaching the said cover to the said plate, said cover suitably shaped to conform to the outer contour of the sausage roll, an outwardly extended member secured to the said plate, said extended member concentric with the said cover for the purpose of providing a uniform space at the bottom and sides thereof, intermediate the said cover and the said extended member, as a means of permitting batter placed therein to be baked in the usual oven for the purpose of providing a sausage roll, said sausage roll of suitable shape so as to conform to and hold a sausage for the purpose of providing a convenient and readily eatable medium.

8. A mold for making a sausage roll comprising a cover, a plate adapted to enclose the open top and two ends of the said cover, a means of removably attaching the said cover to the said plate, said cover suitably shaped to conform to the outer contour of the sausage roll, an outwardly extended member secured to the said plate, said extended member concentric with the said cover for the purpose of providing a uniform space at the bottom and sides thereof, intermediate the said cover and the said extended member, as a means of permitting batter placed therein to be baked in the usual oven for the purpose of providing a sausage roll, said sausage roll of suitable shape so as to conform to and hold a sausage for the purpose of providing a convenient and readily eatable medium, the main portion of the said sausage roll provided with extended elements approximately parallel and having their extremities extended somewhat beyond the said sausage, and a means for loosening the dough.

9. A plurality of sausage roll mold plates secured to a lower plate member, a plurality of sausage roll mold covers secured to an upper plate member, upright members secured to and extended vertically from the lower plate member, engaging members adapted to engage the said upper plate member as a means of removably holding the said covers in place on the said plates, and a manually operated means for loosening the dough from the device.

In testimony whereof I have affixed my signature.

HARRY KORNREICH.